3,405,825
IMPLEMENT ATTACHING MEANS
Paul F. Billenstein, R.F.D. 1, La Rue, Ohio 43332
Filed July 22, 1966, Ser. No. 567,203
7 Claims. (Cl. 214—778)

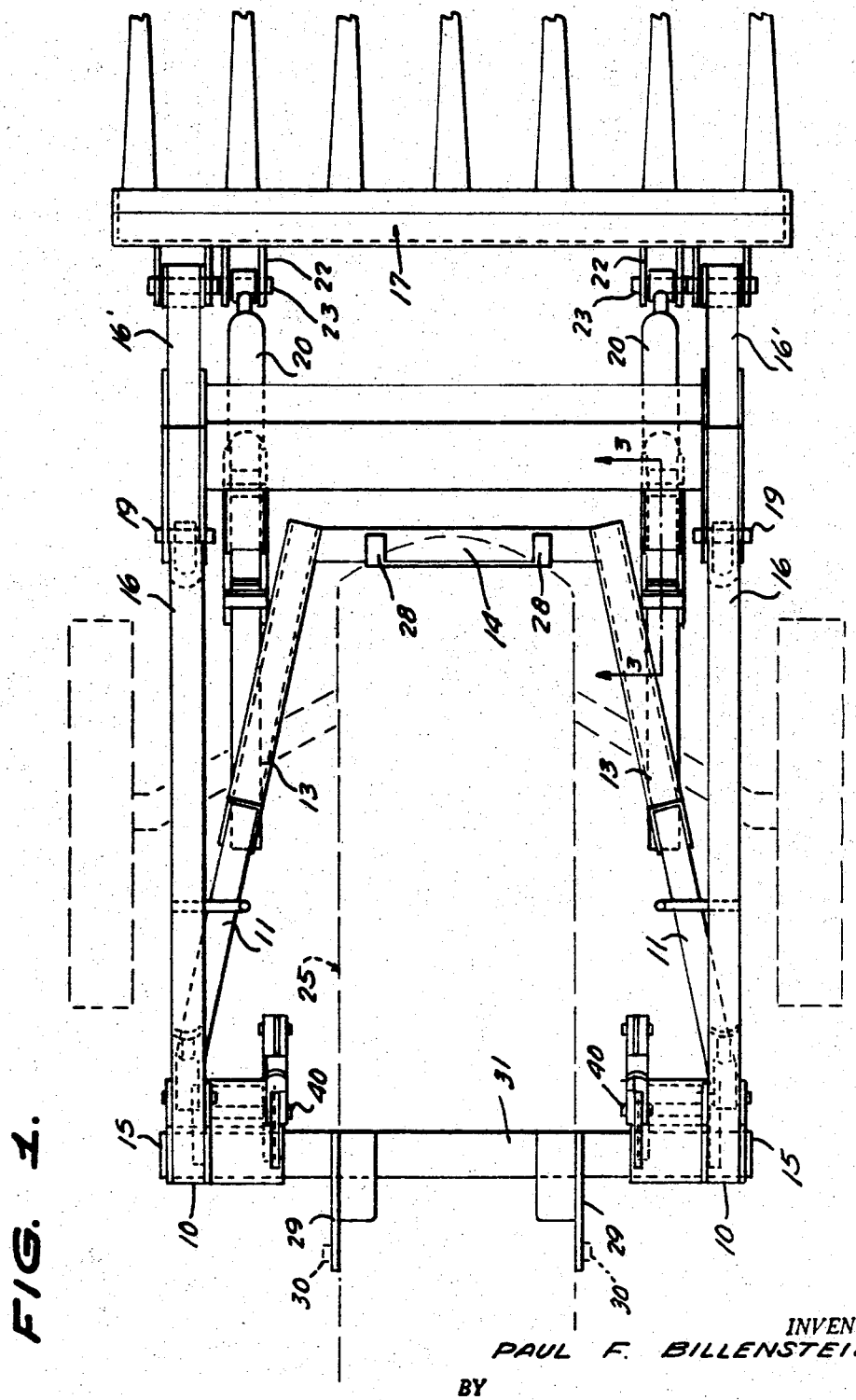

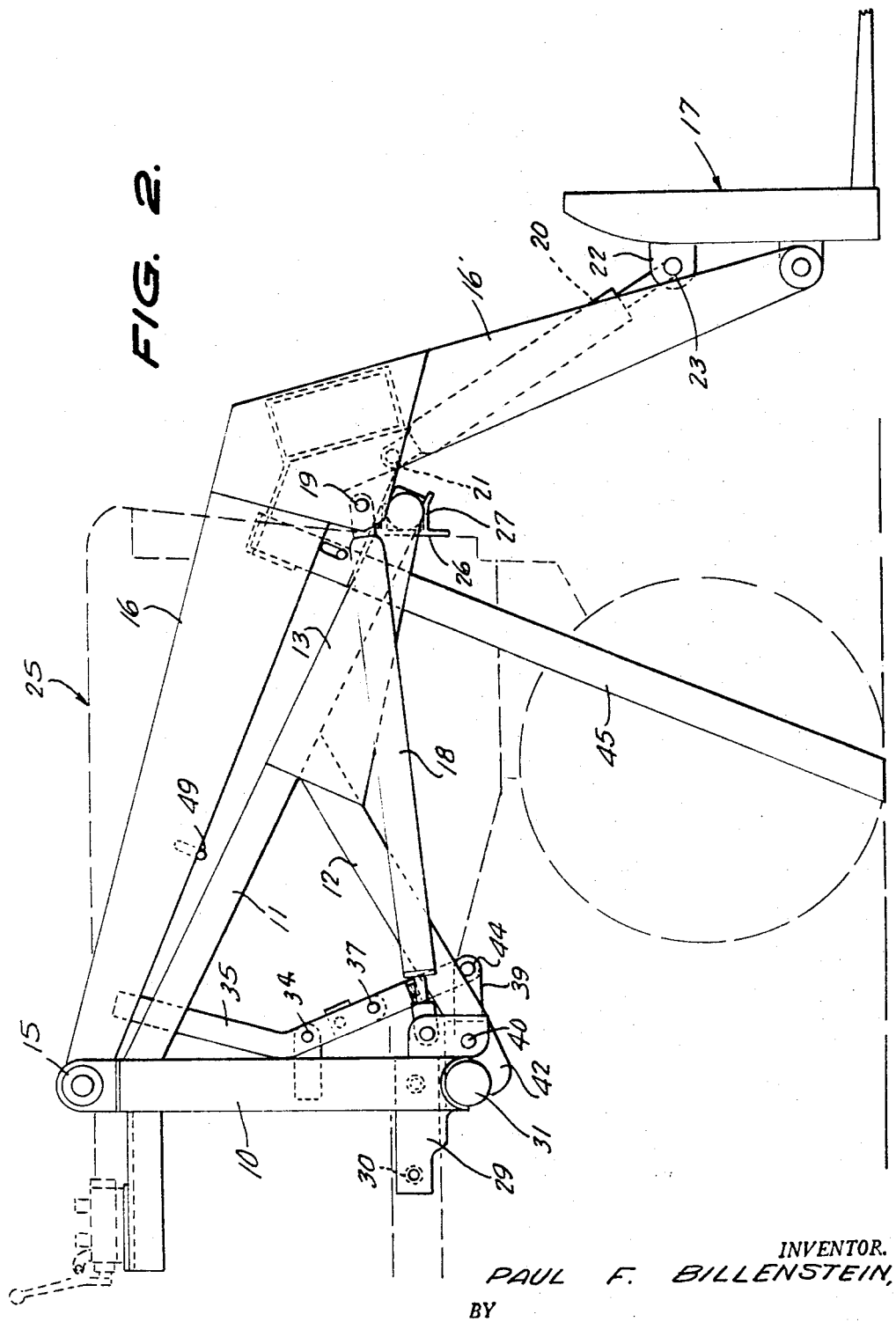

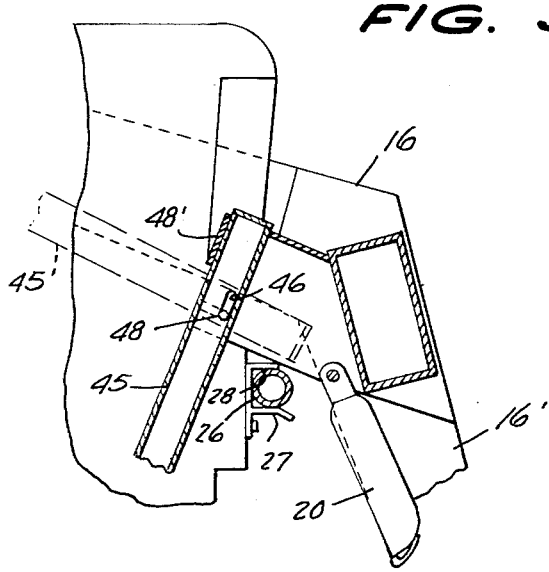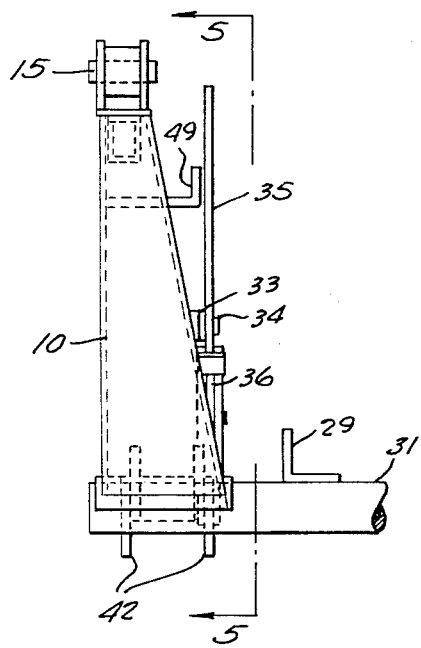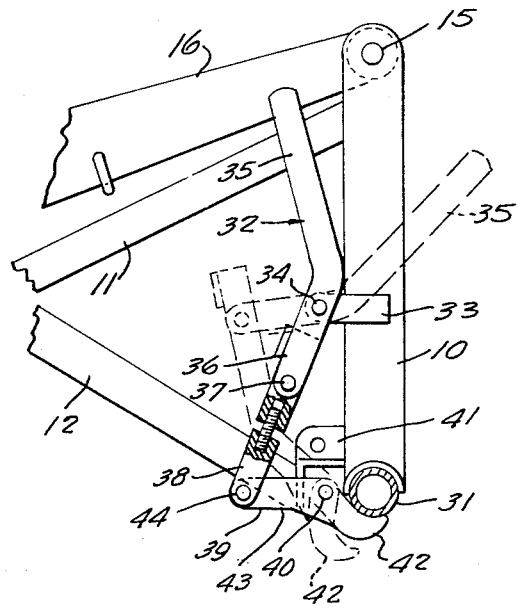

ABSTRACT OF THE DISCLOSURE

An implement support intended to be attached to a tractor. The implement support consists of a frame with a boom structure pivoted thereto. The tractor has a cross-rod on which the support frame engages and the support frame has toggle-actuated clamps for securing the support frame rotatably on the cross-shaft. The frame has a front cross-arm received in a transverse forwardly facing substantially channeled bracket provided on the front of the tractor. Fluid pressure cylinders connected between the boom structure and the frame are employed to rotate the boom structure relative to the frame. Similar fluid pressure cylinders are provided for adjusting the position of an implement pivotally attached to the end of the boom structure. Parking legs are slidably and pivotally attached to the boom structure to support the device when detached from a tractor. The parking leg can be latched to the boom structure in an inoperative position when the device is in use.

---

This invention relates to means for attaching to and supporting on a carrier such as a farm tractor or other suitable vehicle, implements such as a shovel loader or an implement for harvesting and gathering nuts or fruits or other agricultural and horticultural products, or implements for other uses.

The present invention embodies improvements over the implement attaching and supporting means disclosed in my prior Patent No. 2,745,564, entitled, "Shovel Loader Attachment for Tractors."

One object of the present invention is to provide means for quickly mounting and dismounting working implements on and off a tractor or other suitable carrier, and which means may be readily and easily adapted to be mounted on and used with any make and model of tractor.

Another object of the present invention is to provide means whereby when the attaching and supporting means are dismounted from the carrier the attaching and supporting means and the implement supported thereon are maintained in a position of solid stability, and will not tip, tilt, fall or collapse or otherwise constitute a danger to children, persons, or farm animals in the vicinity and maintains the attaching and supporting means in position for quick and easy attachment to the tractor or other carrier without the aid of a second party or extraneous devices other than the motor and hydraulic power means of the tractor, the entire operations of attachment to the tractor and detachment therefrom being manipulated by the operator from the driver's seat on the carrier.

A further object of this invention is to provide a unitary implement attaching means of the character mentioned above and which is simple and sturdy in construction and economical to manufacture and assemble.

Other objects of this invention will be in part obvious and in part pointed out hereinafter and the scope of the application of which will be pointed out in the claims that follow.

In accordance with this invention the implement attaching and supporting means includes framework adapted to support operationally an implement such as a shovel loader or other agricultural or horticultural implement, the framework including parking support legs which, together with the supported implement when resting on the ground, and the framework and the implement thereon, are detached from the tractor or other carrier, provide a parking stand of solid stability and at the same time holding the framework in position for easy and quick remounting on the carrier; the support legs preferably automatically assuming parking-stand position as the framework and implement carried thereby are dismounted from the carrier and the legs are moved to and latched in a storage position when the framework is remounted on the carrier. The framework also includes releasable means cooperating with means on the carrier for firmly latching the framework to the carrier when mounted thereon, the latching and unlatching of the framework and the mounting and dismounting of the framework with the implement thereon being done by the operator from his seat without the necessity of a helper or the help of outside devices.

In order that a clearer understanding of this invention may be had, attention is hereby directed to the accompanying drawings, forming a part of this application, and illustrating one possible embodiment of this invention, and in which:

FIG. 1 is a top plan view of the implement attaching and supporting means with an implement thereon and showing in dash lines the front end of a tractor associated therewith;

FIG. 2 is a side view of the implement attaching and supporting means and an implement thereon and the parts of the latching means which are mounted on the tractor;

FIG. 3 is a sectional view of a portion of the construction and is taken on the line 3—3 of FIG. 1;

FIG. 4 is a rear view of a portion of the construction at the latching means; and FIG. 5 is a sectional view taken on the line 5—5 of FIG. 4.

Similar reference characters refer to similar parts throughout the several views of the drawings.

Referring to the drawings, the implement supporting and attaching means includes framework comprising two laterally-spaced vertical side frames each frame including a rear upstanding support arm 10, an upper arm 11 extending downwardly and forwardly from the upper end portion of the support arm 10 and a strut 12 extending from the lower portion of the support arm 10 upwardly and forwardly to the arm 11 intermediate its ends. The top of strut 12 and the forward end of the upper arm 11 are received in a sleeve or housing 13 and the front ends of the two arms 11 and housings 13 are connected together by a cross-beam 14. When mounted on a tractor or other carrier the cross-beam 14 extends across the front of the carrier and the side members extend rearwardly along the two sides of the carrier. To the top of each support arm 10 is pivoted, as at 15, a push arm or boom 16 which, at their front ends, pivotally carry the work implement such as a shovel loader between them and indicated generally by the numeral 17. The booms 16 are dog-legged downwardly at their front portions 16' to permit lowering of the implement to the ground without interference by the rear portions of the booms 16 contacting the wheels of the carrier when the wheels are spaced apart a relatively wide distance. This adapts the framework to be mounted on most any type of tractor or carrier and does not limit the framework to be suitable for the "row-type" tractor only.

An hydraulic piston and cylinder assembly 18 extends between the lower portion of each support arm 10 and the boom 16 on that side near its center, as at 19, whereby the booms 16 and the implement carried thereby may be raised and lowered utilizing the hydraulic power of the tractor or carrier through suitable severable piping connections (not shown).

Also another hydraulic piston and cylinder assembly 20 extends at each side between the boom 16 near its center, as at 21, and a lug 22 on the rear of the implement 17, as at 23, whereby the implement 17 may be pivoted forwardly and rearwardly on the booms 16, utilizing hydraulic power from the tractor or carrier through suitable disengageable piping connections (not shown).

Rigidly mounted on the front of the tractor or other carrier 25 is a horizontal bracket 26 having a lower forwardly extending flange 27 and upper forwardly extending flange or flanges 28. The cross-beam 14 of the framework is removably received between the flanges 27 and 28. Also on each side of the tractor at about its center of gravity a bracket 29 is rigidly secured to the frame of the tractor, as by bolts 30. The brackets 29 carry a transversely disposed supporting bar 31 which is engaged by the lower ends of the framework support arms 10 and pivotally support the framework at its rear. The lower ends of the support arms 10 have curved recesses fitting the surface curvature of the bar 31. (See FIG. 2.)

The framework carries on each side a clamping device, best shown in FIG. 5, adapted to engage the bar 31 from below and clamp the framework arms 10 against upward displacement from the bar 31. The clamping device includes a lever 32 pivoted on a bracket 33 secured to arm 10, as at 34, the lever 32 having an upper handle arm 35 and a lower arm 36. The lower end of arm 36 is pivoted, as at 37, to a link 38. A clamping lever 39 is pivoted, as at 40, to another bracket arm 41 on arm 10, the forward end 42 being swingable upwardly against the bar 31 from beneath and the rear end of the rear arm 43 of lever 39 being pivotally connected, as at 44, to link 38. The position of the clamping device when the handle portion 35 is moved to the forward position, is shown in full lines in FIG. 5, and the position when the handle portion 35 is moved to the rearward position is shown in dash lines in that figure. The connection between the hand lever 32 and the clamp finger 42 is of the "over the center" or toggle type so that the clamp finger is locked in clamping position.

Each boom 16 carries a parking leg 45 which, toward its upper end, has a longitudinal slot 46 in which engages a pin 48 carried by the boom 16. The boom 16 also carries a sleeve 48' in which the upper end of the leg 45 seats when the leg is moved upwardly relatively to the boom, thus locking the leg in its lowered position from the boom. Raising the boom releases the leg 45 from the sleeve 48' due to the pin-and-slot arrangement, and as the boom raises the leg pivots toward the boom and swings into locking engagement with a latch 49 carried by the boom. When the attachment is to be dismounted from the carrier the leg 45 is unlatched from the latch 49 and the leg swings downwardly therefrom automatically and is ready upon reaching the ground to lock in the sleeve 48' in parking position.

In the parked position the parking legs and the implement carried at the ends of the boom 16 rest on the ground. To mount the attachment and the implement thereon on a tractor the tractor is driven under the framework until the cross-beam 14 of the framework engages in the bracket 26 on the tractor or other carrier. Then the implement 17 carried between the ends of the boom 16 is manipulated to pivot the booms and the framework rearwardly with the legs 45 serving as a fulcrum. This rearward pivoting of the framework moves the supporting arms 10 thereof until the lower ends of the arms 10 rest on the hubs 31. Then the clamping devices are operated by means of hand levers 32 to clamp the supporting arms 10 down on the hubs 31. Then, by swinging the booms 16 upwardly the parking legs 45 are released from the retaining sleeves 48' and swing into storage position against the booms 16 where they beceome latched by means of latches 49. To dismount the attachment and the implement carried thereby from the tractor the latching devices are operated to unclamp the lower ends of the support arms 10 from the framework of the tractor, the parking legs 45 are unlatched from the booms 16, the implement carried between the booms is lowered to the ground, and the tractor is withdrawn from the framework.

From the above it will be apparent that the implement attaching means can be easily and quickly attached to a tractor or other carrier and can easily and quickly be dismounted therefrom. Also, the attachment can be easily and quickly mounted on and dismounted from tractors and carriers of different types.

What is claimed is:

1. An implement attaching and supporting device comprising framework adapted to be mounted on a transverse cross-member of a tractor or other carrier, spaced booms carried on said framework and extending forwardly thereof and adapted to carry an implement between the forward ends of the booms, spaced upstanding support arms pivotally supporting the rear ends of said booms, said support arms having downwardly-facing curved recesses at their lower ends fitting the surface curvature of the transverse cross-member, a strut structure projecting forwardly from each of said arms and carried thereby, a cross-beam connecting the strut structure together and adapted to be detachably connected to mounting means provided on the tractor or carrier, the lower ends of said support arms being adapted to seat rotatably upon the cross-member provided on the tractor or carrier, a parking leg on each boom pivoted at its upper end portion thereto and rearwardly of the outer end of the boom, whereby when the parking legs extend downwardly from the booms to the ground and the implement carried by the booms rests on the ground the framework is supported in a position elevated from the ground.

2. An implement attaching and supporting device as set forth in claim 1 and in which said leg is pivoted on said boom by means of a slot in said leg and a pivot pin on said boom seated in said slot permitting the leg to be shifted longitudinally relatively to the boom, said boom being provided with sleeve means receiving the top portion of and locking the leg in a depending supporting position when the pivot pin is in the bottom portion of the slot.

3. A device as set forth in claim 2 and in which each leg is swingable on the boom into position extending downwardly from the boom and into position extending alongside the boom, and further locking means on the boom coacting with the leg when in the latter position to lock the leg in said latter position.

4. The combination with a carrier including a transversely disposed supporting bar at the intermediate portion of the carrier and a front forwardly facing substantially channeled mounting means, of an implement attaching and supporting framework having two spaced side frames each including an upstanding rear support arm formed with a curved downwardly facing bottom recess rotatably seating upon said support bar whereby the rear of said framework is rotatably supported, and a cross-beam extending between the front ends of said side frames, said cross-beam being detachably engaged in said substantially channeled mounting means whereby the framework is supported at its front.

5. Implement mounting means as set forth in claim 4 and having a clamping device on each side frame in the vicinity of the lower ends of said support arms, each device having a clamp adapted to be clamped against the underside of said recessed bottom end of the supporting bar to clamp the supporting arm down on said supporting bar, said clamping device having means whereby said clamp may be moved into and out of clamping engagement with said supporting bar.

6. Implement mounting means as set forth in claim 5 and in which the clamp moving means includes a hand lever operationally linked to said clamp.

7. Implement mounting means as set forth in claim 6 and in which the hand lever and the linkage is of the "over the center" or toggle type whereby the clamp is locked in clamping position.

References Cited

UNITED STATES PATENTS

| | | | |
|---|---|---|---|
| 2,667,708 | 2/1954 | Gjesdahl | 172—273 X |
| 2,833,432 | 5/1958 | Foster | 214—780 X |
| 3,014,538 | 12/1961 | Hobbs | 172—273 |
| 3,131,823 | 5/1964 | Foster et al. | 214—778 |

HUGO O. SCHULZ, *Primary Examiner.*